(12) United States Patent
Novak

(10) Patent No.: US 9,561,614 B2
(45) Date of Patent: Feb. 7, 2017

(54) METHOD AND APPARATUS FOR TRANSPORTING ARTICLES TO A STATION

(75) Inventor: Peter Novak, Taegerwilen (CH)

(73) Assignee: NOV HAU AG ENGINEERING, Taegerwilen (CH)

(*) Notice: Subject to any disclaimer, the term of this patent is extended or adjusted under 35 U.S.C. 154(b) by 129 days.

(21) Appl. No.: 14/123,396

(22) PCT Filed: May 30, 2012

(86) PCT No.: PCT/EP2012/060174
§ 371 (c)(1),
(2), (4) Date: Feb. 21, 2014

(87) PCT Pub. No.: WO2012/163978
PCT Pub. Date: Dec. 6, 2012

(65) Prior Publication Data
US 2014/0151189 A1    Jun. 5, 2014

(30) Foreign Application Priority Data
Jun. 3, 2011    (DE) .................. 10 2011 050 843

(51) Int. Cl.
| | | |
|---|---|---|
| B65G 47/12 | (2006.01) | |
| B29C 49/42 | (2006.01) | |
| B65G 21/20 | (2006.01) | |
| B65G 51/03 | (2006.01) | |
| B65G 47/14 | (2006.01) | |
| B29C 49/06 | (2006.01) | |

(52) U.S. Cl.
CPC ....... *B29C 49/4205* (2013.01); *B29C 49/4252* (2013.01); *B65G 21/2036* (2013.01); *B65G 47/1435* (2013.01); *B65G 51/035* (2013.01); *B29C 49/06* (2013.01); *B29C 2049/4231* (2013.01); *B65G 2201/0247* (2013.01)

(58) Field of Classification Search
CPC .................. B29C 49/4205; B29C 49/4252
USPC ....................... 198/443, 416, 689.1
See application file for complete search history.

(56) References Cited

U.S. PATENT DOCUMENTS

| | | |
|---|---|---|
| 5,695,302 A | 12/1997 | Hilbish |
| 5,853,080 A | 12/1998 | Patois et al. |
| 6,033,156 A | 3/2000 | Marti Sala |
| 6,494,646 B1 | 12/2002 | Sala |
| 6,968,936 B2 | 11/2005 | Charpentier |
| 7,028,857 B2 | 4/2006 | Peronek |
| 7,322,458 B1 | 1/2008 | McDonald et al. |
| 8,739,961 B2 * | 6/2014 | Marti Sala et al. ....... 198/471.1 |
| 2008/0113055 A1 | 5/2008 | Charpentier et al. |
| 2008/0142337 A1 | 6/2008 | Mouette et al. |
| 2008/0142339 A1 | 6/2008 | Charpentier |

FOREIGN PATENT DOCUMENTS

| | | |
|---|---|---|
| DE | 102009016593 A1 | 10/2010 |
| EP | 0790200 A2 | 8/1997 |

(Continued)

*Primary Examiner* — William R Harp
(74) *Attorney, Agent, or Firm* — Bachman & LaPointe, PC

(57) ABSTRACT

A method for transporting articles (2) to a station, in particular preforms to a blow-molding apparatus, wherein each article has a protrusion (10) and is moved along a guide (16) by a drive means (18), the article (2), along at least part of the guide (16), should be retained on an abutment (19, 21, 23), and advanced along this abutment, by an air stream.

7 Claims, 7 Drawing Sheets

(56) References Cited

FOREIGN PATENT DOCUMENTS

| EP | 1106545 A1 | 6/2001 |
|---|---|---|
| EP | 1690813 A1 | 8/2006 |
| JP | 2001088207 A | 4/2001 |
| WO | 0236466 A1 | 5/2002 |
| WO | 2004069700 A1 | 8/2004 |
| WO | WO 2010100539 A1 * | 9/2010 |

* cited by examiner

METHOD AND APPARATUS FOR TRANSPORTING ARTICLES TO A STATION

BACKGROUND OF THE INVENTION

The invention relates to a method for transporting articles to a station, in particular preforms to a blow-molding apparatus, wherein each article has a protrusion and is moved by a drive means along a guide, and also to an apparatus for this purpose.

According to the current prior art, articles are conveyed to a subsequent processing device either via gravitational methods having a roller sorter and an elevated chute (WO 02/36466 A1) or are oriented by centrifugal methods on a rotating disk or ring and conveyed to the subsequent processing station by means of an actively driven conveyor section or the like (WO 2004/069700 A1, US 2008/0113055 A1, EP 1 690 813 A1).

For example, U.S. Pat. No. 7,322,458 B1 shows the possibility of singularizing the individual articles in chambers which are disposed on conveyor belts.

According to DE 10 2009 016 593 A1, singularizing takes place in a cell-wheel-like transfer device.

In US 2008/0142337 A1, individual preforms are placed between circulating belts, wherein two belts serve to orient the preforms and a belt located therebeneath serves for transport.

According to US 2008/0142339 A1, preforms are singularized in cavities of a transport wheel.

The closest prior art is shown by EP 1 690 813 A1, according to which preforms or similar articles pass onto a turntable and are trapped in a circumferential slot between the directing walls and the turntable.

In all of the known apparatuses and methods, as the speeds become increasingly high (30 000 to 80 000 preforms per hour and more), large fluctuations in the process speed occur, resulting in long buffer sections upstream of the subsequent processing machine, for example the blow-molding machine. Furthermore, malfunctioning or stoppage of the plant on account of wrongly oriented and/or jammed preforms occurs. Previously, attempts were made to stabilize the process, to eliminate the disruptive elements and to control/regulate this delicate and highly dynamic process by means of expensive sensors and complicated regulation means. It has been shown, in particular in all centrifugal methods, that it is particularly difficult technically to ensure that preforms which leave the disk or the ring are also correctly oriented and positioned. Furthermore, local accumulations of preforms occur in the event of overfeed on the disk or ring, and these disrupt the orientation of the preforms thereby making the output of the disk insufficient. If the overfeed lasts too long, this often results in overfilling of the disk or ring and finally in the failure of the system.

It has furthermore been shown that at conveying rates above about 60 000 preforms per hour, the reactivity/reaction rate of these regulation mechanisms and the inertia of the system become critical. A further problem is that of removing a homogeneously fed quantity of preforms from a storage container which contains the preforms as bulk material and supplying this quantity to the following system. Freshly unpackaged preforms have high mutual adhesion and this can result in the formation of clusters and accumulation of preforms. Consequently, such feeding and supply systems usually convey the preforms in a highly discontinuous manner in pulses and clusters.

A further problem is that the blow-molding process for PET bottle production sometimes forces the immediate stoppage of the preform supply to the stretch blow-molding machine on account of faults. The stretch blow-molding machine continues to operate at full speed (desired value) but without blow-molding bottles (no-load operation). After the fault has been eliminated, the process is immediately resumed at the desired value without a start-up ramp. At high conveying rates, the inertia of the supply system often causes difficulties such that long buffer sections are again required in order to compensate said difficulties. As the conveying rates become increasingly high (60 000 preforms per hour and more), this can virtually no longer be achieved reliably.

The object of the present invention is to remedy the abovementioned disadvantages and to develop a method and an apparatus of the abovementioned type, which is distinguished by very high efficiency and simplicity, in particular stands out on account of self-regulating behavior of the system, which are dynamically adapted, control/regulate themselves, remain continuously in operation and smooth and homogenize the flow of preforms, thereby allowing high reliability and reactivity at high conveying rates. The whole is also intended to be realizable in a cost-effective manner.

SUMMARY OF THE INVENTION

The foregoing object is achieved providing that, along at least a part of the guide, the article is held against an abutment by an air stream and is transported further along this abutment.

This air diverter, as it is known, is designed such that the articles/preforms are supported only on one side over a particular length, are held in equilibrium by a suction stream and are driven by a continuous rail having an upwardly directed sharp edge. The continuous rail is only one example for a movable directing element. It can also be replaced by a correspondingly configured chain or belt. The suction stream, too, provides only a preferred possibility. It would also be conceivable for the articles to be pressed by air against an abutment and for this air stream to be switched off as soon as a backup is detected. As soon as the backup is resolved, the pressurized air can be reapplied. Alternatively, in the event of a backup, the articles are pushed out of the region of the pressurized air. In this case, further possibilities are conceivable which are intended to be encompassed by the present invention.

The movable directing element supports and drives the articles. The suction stream at for example a slot in a housing of the air diverter compensates the tipping moment that occurs on account of the force bearing on one side and holds the articles in equilibrium on the movable directing element. In this case, the articles are guided along the housing or a similar abutment or a separate stop.

The compensation/action by the suction stream is limited, however. If an article is wrongly oriented, wrongly positioned or the thrust pressure of the subsequent articles is too high, the stable equilibrium cannot be maintained and the article moves by itself out of the main stream of the articles so that the suction stream is no longer effective and the article drops down. It can then be guided back onto the turntable in an internal circuit.

The interaction of the stationary directing element and the movable directing element in the guide has the effect of setting the article into rotation about its longitudinal axis. This gives it a spin which ensures that the article remains in a stable "attitude" on traversing the air diverter (gyroscope effect).

Thus, the air diverter fulfills substantially the following three main functions:

1. It limits the thrust pressure which can be transmitted rearwardly via the free section/air diverter. It acts like a pressure control valve:
   If the thrust pressure is too high, the articles escape by themselves until the thrust pressure has been reduced;
   if no or only a little thrust pressure is present, all correctly oriented and correctly positioned articles can cross the free section/air diverter and pass into the inlet region of the transport and accumulating section.
2. It eliminates wrongly positioned and/or wrongly oriented preforms and also interlocked articles from the main stream of the articles.
3. It increases the dynamic reactivity of the system essentially in that the stream of articles leading to the air diverter can always be kept in motion, even in cases in which the transport and accumulating section is fully occupied and/or the discharging stream of articles is stopped. Only small buffer lengths are necessary, which then have to be accelerated again.

If the stream of articles to the subsequent processing machine is stopped for a relatively long time, a bypass can be mechanically opened in the negative pressure supply of the air diverter, in order to interrupt the suction action of the air diverter. As a result, the entire stream of articles is diverted without thrust pressure at the air diverter and passes into an internal return flow.

The design ensures that the system (internal circuit with orientation process) can remain continuously in motion. The inertia of the system on restarting is thus eliminated. The air diverter only diverts the stream of preforms, without stopping it, specifically either into the transport and accumulation section or into the internal circuit. On account of the natural inherent behavior, this system is able to make the stream of articles available, even at high conveying rates, without slowing down the subsequent processing machine.

What should be emphasized above all is that no sensors, regulating means and mechanisms having moving parts are required in order to control the switching operation of the air diverter. If space is available in the transport and accumulation section which is positioned upstream of the entry/inlet/stepping wheel of the subsequent processing machine, the correctly lined up articles follow this path. If the section is full, this path cannot be taken, since the space is occupied by the already lined up articles. The subsequent articles move out of the way by themselves. The latter pass into the internal circuit/return flow and repeat the preceding singularizing process. The transport and accumulation section is continuously filled with articles as far as the air diverter which is arranged at the inlet to the transport and accumulation section and all excess articles are continuously turned away here.

Otherwise, consideration has been given to having the suction stream act not only laterally on the articles. It is also conceivable for the articles to be drawn upward by the suction stream, wherein subsequent articles which strike articles already located in the accumulation section are laterally deflected and pass out of the region of the suction stream. Many possibilities are conceivable here and are intended to be encompassed by the present invention.

Following the air diverter in the accumulation section, the articles possibly backing up there should additionally be held by a holding-down means and optionally by a third lateral spring system.

A further inventive concept for which protection is also independently desired, relates to the guide of the articles itself by means of the stationary and movable directing element. This drive is only on one side and frictional and is generated by the movable directing element.

As a result of the selected drive with the movable directing element interacting with the stationary directing element, the articles are held only at two points, in the case of preforms preferably under the protrusion/annular collar. The arrangement ensures that the article is rotated about the edge of the continuous rail and/or along the latter and turns on the stationary directing element. The article is not held in a form-fitting manner but is in frictional contact with the movable directing element. As a result, the article is set into rotation at the speed of the movable directing element.

The movable directing element and the stationary directing element may have a vertical offset with respect to one another, but the distance between them is in any case smaller than the diameter of the protrusion/annular collar. By way of a corresponding inclination of the directing elements with respect to one another, the article can be moved and held in any desired orientation in space.

The singularizing device is also intended to be adapted according to the invention to the accelerated transport means for the articles. However, separate protection is also desired for this improvement. The improvement consists primarily in the fact that the turntable is enclosed at least partially but not completely by a directing wall, which has a larger radius than the turntable. Thus, the directing wall is located outside the turntable. Preferably, the directing wall is then continued in the stationary directing element of the guide.

The arrangement of the directing wall outside the turntable ensures that the article drops slightly into the inclined gap between the directing wall and the turntable, assumes a stable position and jamming occurs here more rarely. To this end, provision is furthermore made for the directing wall also to be vertically offset with respect to the turntable. The offset should occur such that the articles are transported further in a stable inclined position of about 45°±20°.

BRIEF DESCRIPTION OF THE DRAWINGS

Further advantages, features and details of the invention can be gathered from the following description of preferred exemplary embodiments and with reference to the drawing, in which.

DETAILED DESCRIPTION

Figure 1:
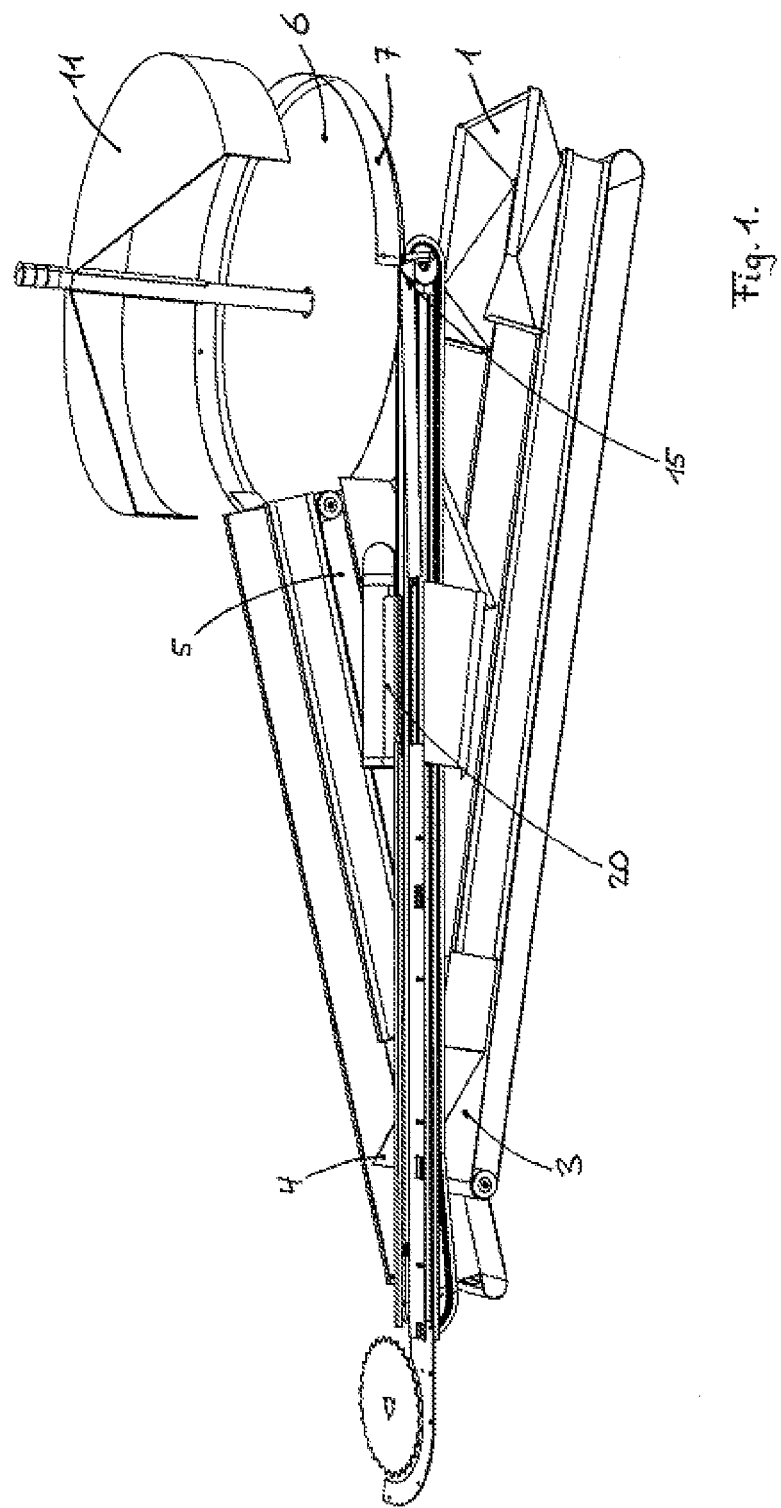
FIG. 1 shows a perspective view of an apparatus according to the invention for transporting articles to a station, wherein the station itself is not shown.

An apparatus according to the invention for transporting articles (not shown in more detail in FIG. 1) to a station (likewise not shown in more detail) has a hopper 1 from which the articles 2, as are shown in particular in FIGS. 3 to 7, pass onto an upwardly directed inclined conveyor 3. From this inclined conveyor 3, the articles 2 are transferred by a directing plate 4 onto a further inclined conveyor 5, from which the articles pass onto a turntable 6. In this case, the inclined conveyor 5 breaks through a directing wall 7 or is arranged directly above this directing wall 7. This ensures that a distance of the mouth of the inclined conveyor 5 is arranged as low as possible over the turntable 6 so that the articles do not have to bridge a large height when dropping freely onto the turntable 6. On account of the arrangement according to the invention of the inclined conveyor 3, directing plate 4 and inclined conveyor 5 elements, the quantity of articles supplied in a clustered and pulsed manner is homogenized and smoothed.

For a more detailed description of the turntable, reference is made in particular to EP 1 690 813.

Figure 3:
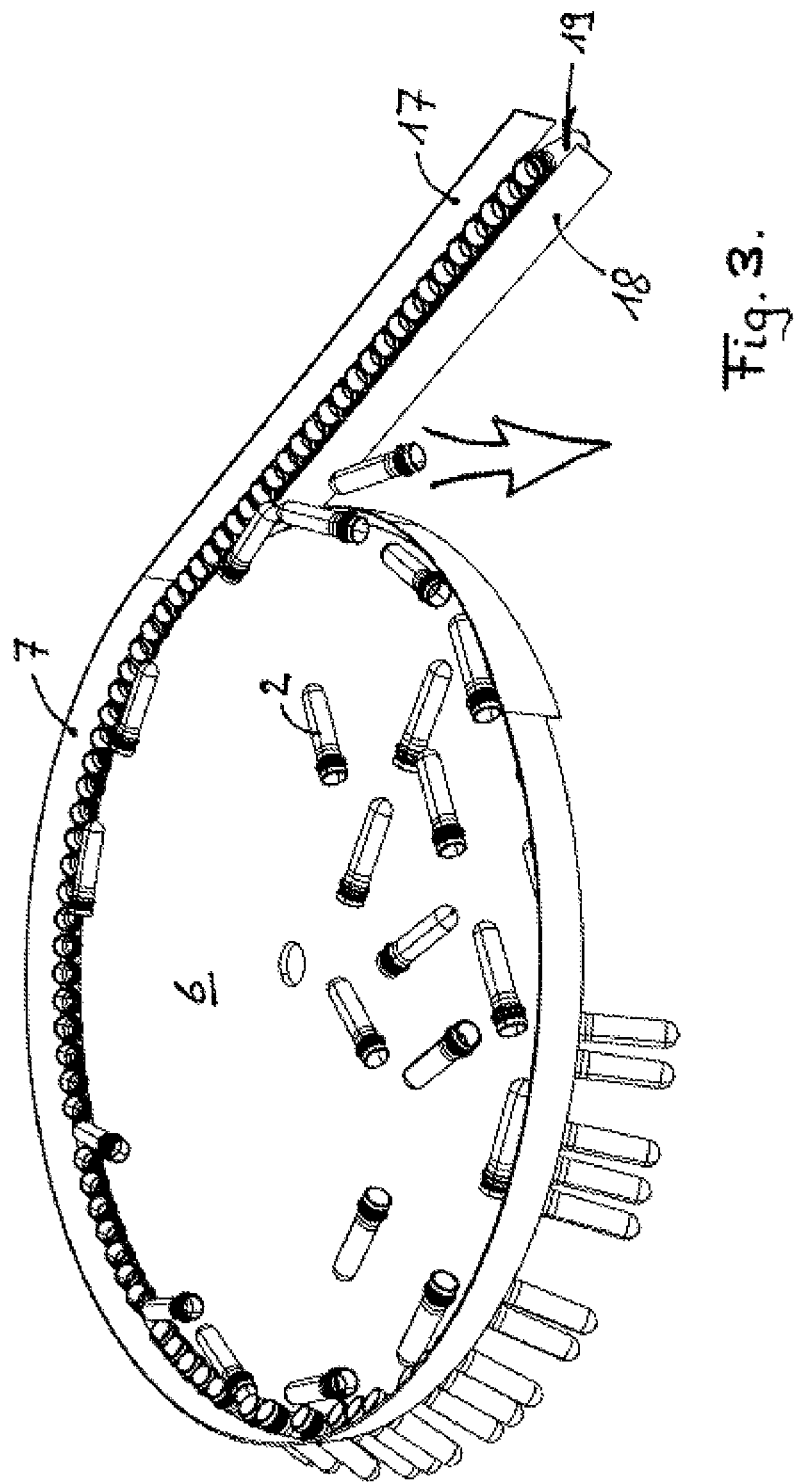
FIG. 3 shows a schematic oblique plan view, illustrated partially in perspective, of a singularizing device.
Figure 4:
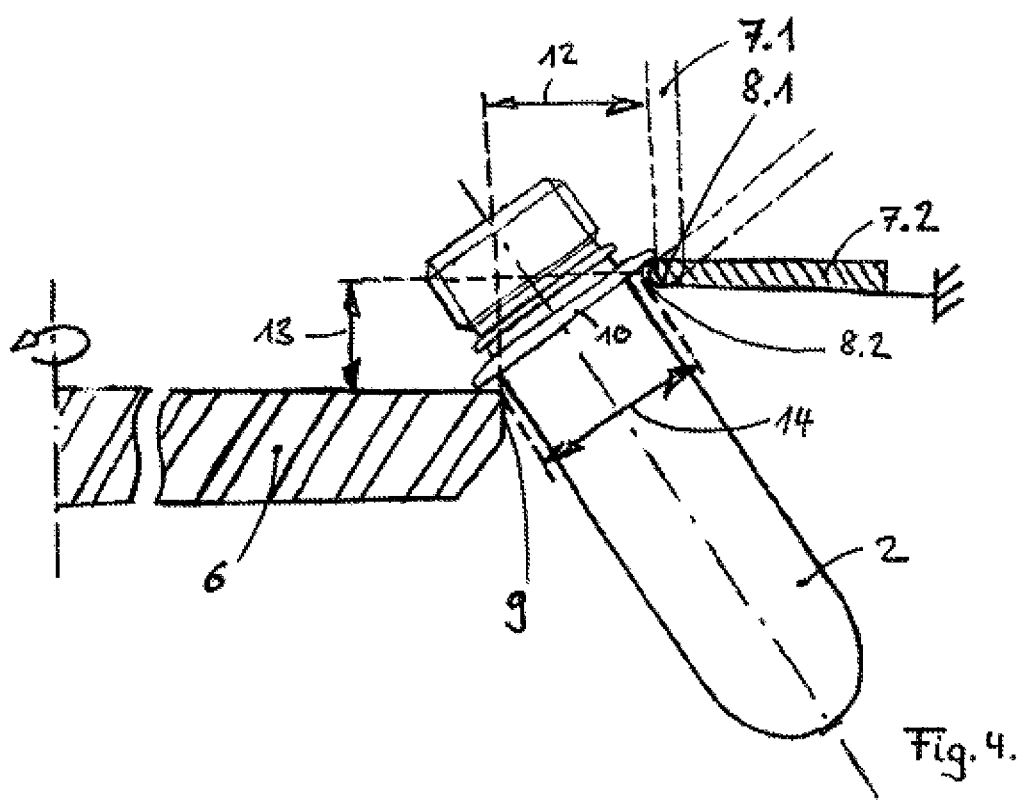
FIG. 4 shows a section, illustrated on an enlarged scale, through a subregion of the singularizing device according to FIG. 3.
Figure 5:
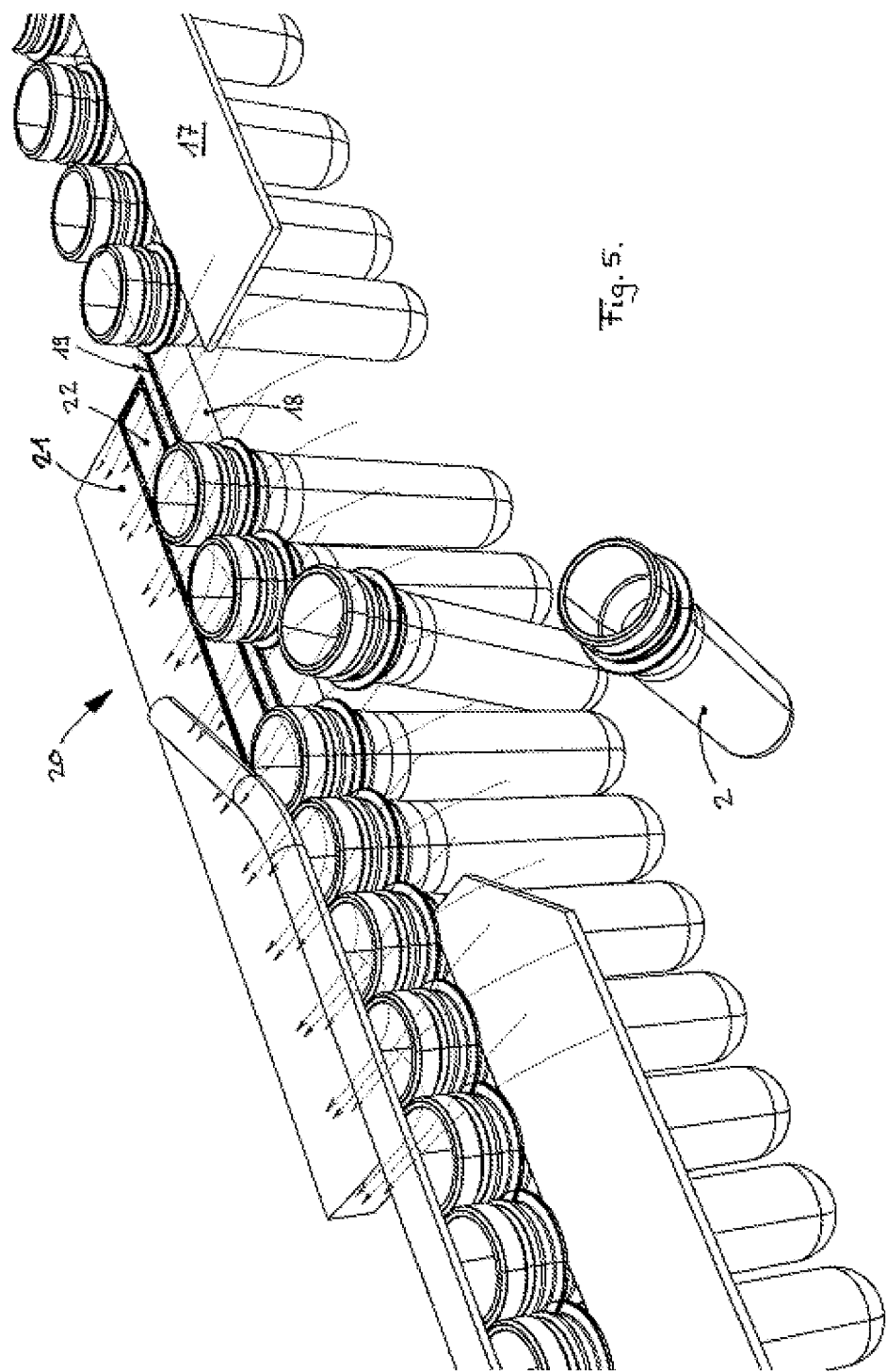
FIG. 5 shows a perspective view of a partial detail of a guide according to the invention for the articles.

A first feature of the present invention relates to the relationship between the turntable 6 and the directing wall 7. In FIG. 3, a directing wall 7.1 is erected vertically and encloses the turntable 6. By contrast, a directing wall 7.2 in FIG. 4 is arranged horizontally. Positions in between are possible. It is essential in the present invention that the directing wall 7.1 or 7.2 is arranged with its lower or inner peripheral edge 8.1 or 8.2 both with a horizontal offset 12 and with a vertical offset 13 with respect to a circumferential edge 9 of the turntable 6. In other words, the directing wall 7.1, 7.2 is arranged coaxially with the turntable 6 but outside the latter. The corresponding gap dimension 14 is smaller than the diameter of an annular collar 10 of the article and is preferably constant around the entire turntable. In this way, the oriented articles are transported in a stable inclined position (approximately 45°±20°).

Since the inclined conveyor 5 is arranged laterally and relatively deeply with respect to the turntable 6, it is now possible to cover the entire turntable and thus the entire singularizing device by means of a hood 11. This hood 11 is preferably vertically movable, it being supported by corresponding energy stores in its vertical movement. It has the effect that firstly the singularizing itself takes place in a closed space, so that the noise is reduced, no articles can be thrown outwards, the process and persons are protected, and no soiling passes from the environment onto the turntable.

Figure 2:
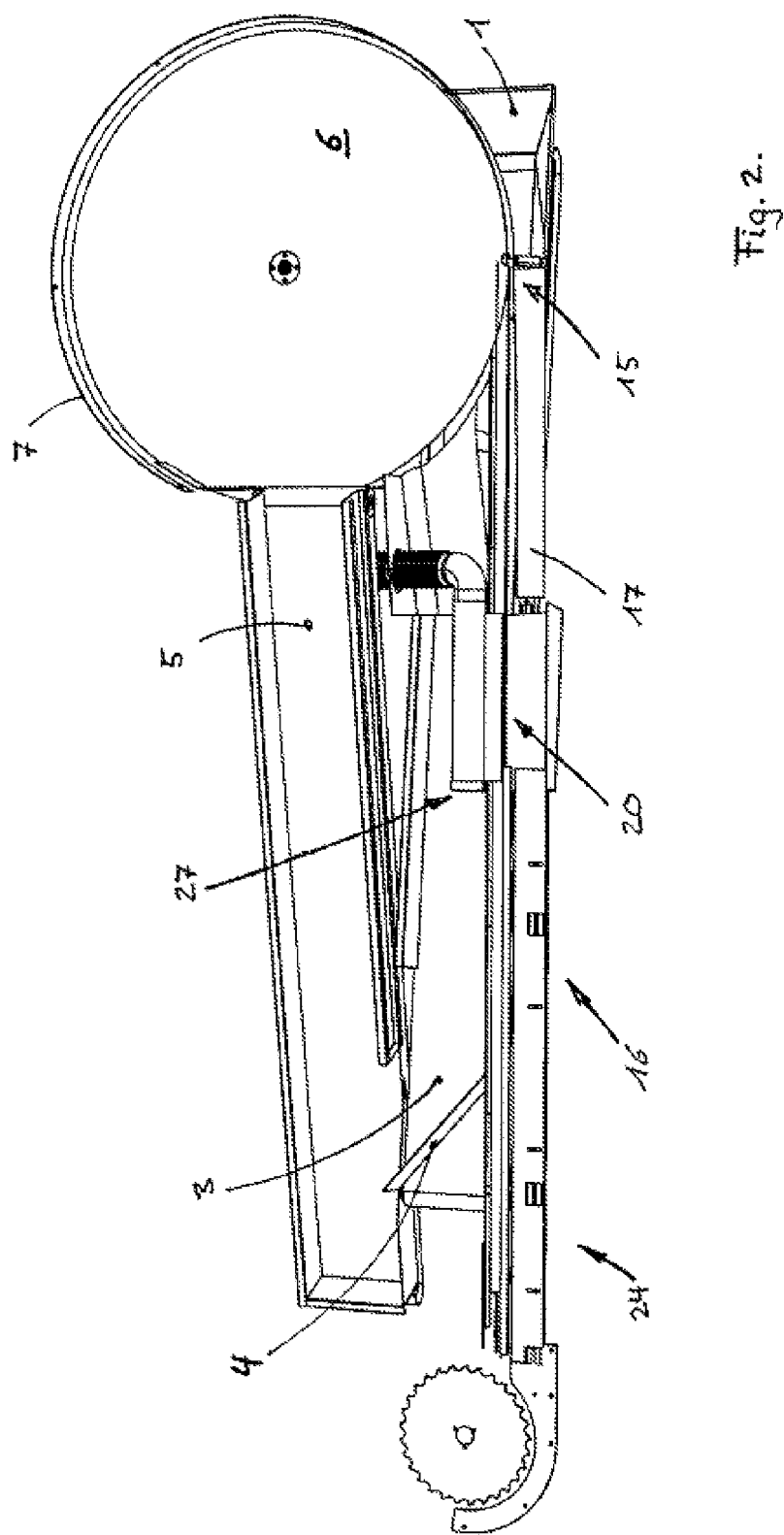
FIG. 2 shows a plan view of the apparatus according to the invention according to FIG. 1.

Once the articles have been trapped in the gap, defined by the gap dimension 14, between the turntable and the directing wall 7, they are transferred in a transition region 15 (see FIG. 2) to a guide 16. At the same time, in the vicinity of this transition region 15, a region may also be provided at which articles which have not been trapped are thrown out again. In particular when the gap between the turntable and the directing wall is completely occupied by articles, all surplus articles circulate on an inner path on the turntable and are thrown out in the vicinity of the transition region 15 on account of the at least partial lack of the directing wall 7 in the subsequent sector of the turntable and returned to the inclined conveyor 3.

Provided in the guide 16 is a stationary directing element 17 which engages under the annular collar 10. This stationary directing element 17 is formed in a rail-like manner. Preferably, it is, as mentioned above, a simple continuation of the directing wall 7.2 in a straight direction.

Figure 6:
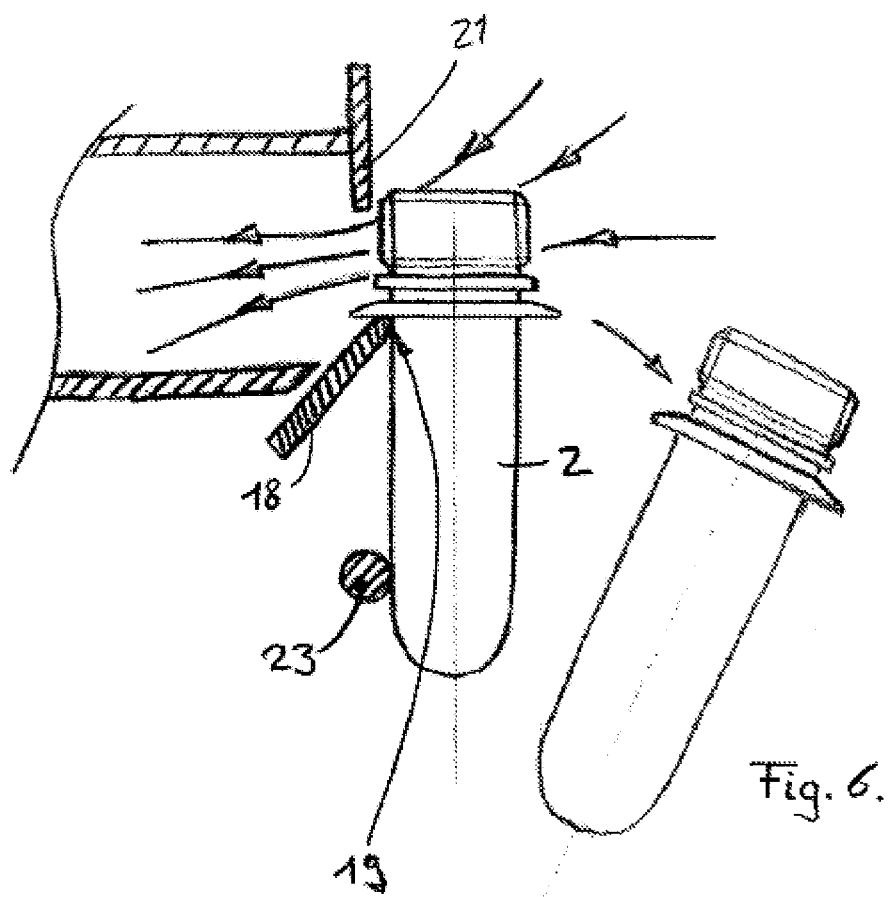
FIG. 6 shows a perspective partial view of a subregion of the guide according to FIG. 5.
Figure 7:
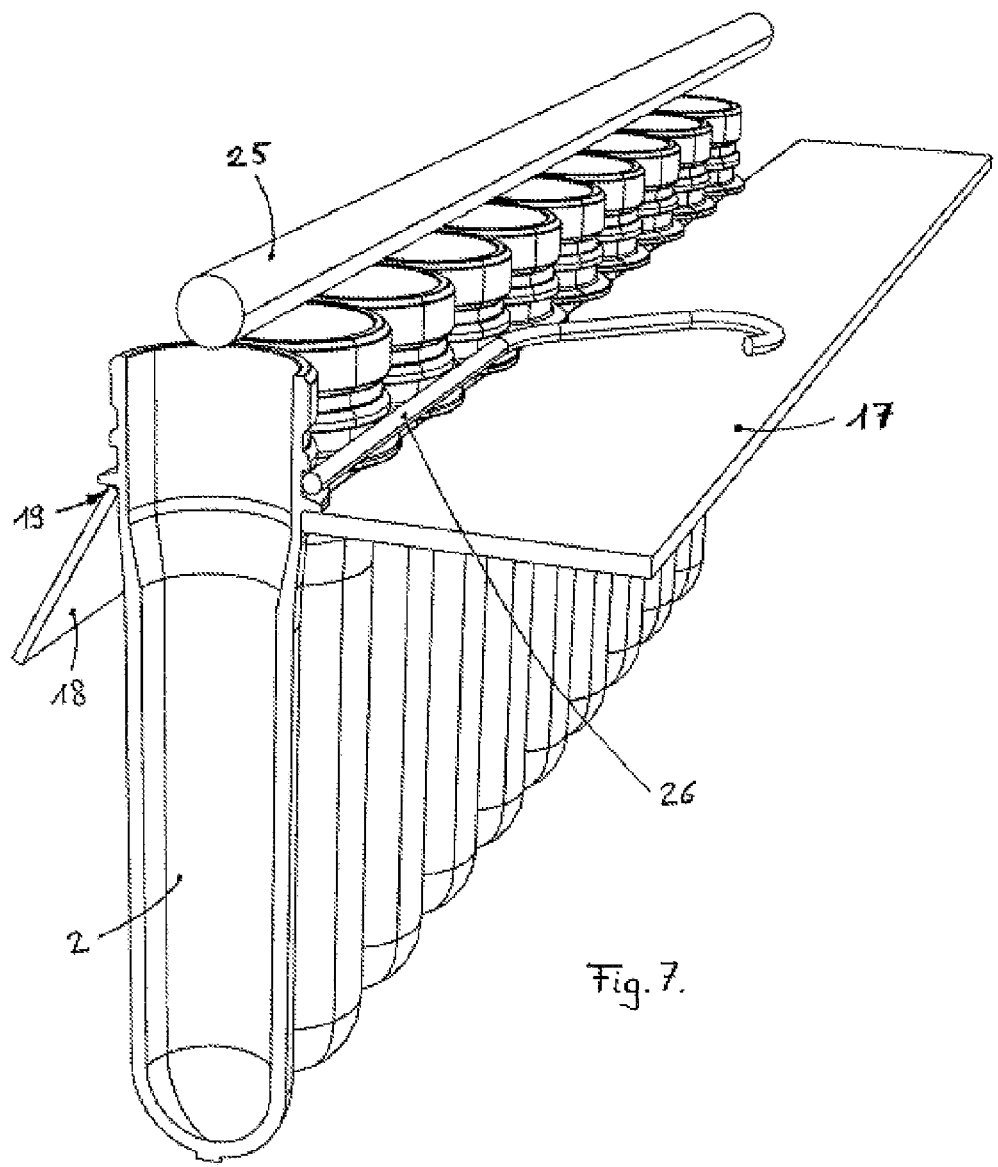
FIG. 7 shows a section, illustrated in perspective, through a further subregion of the guide.

The stationary directing element 17 interacts with a movable directing element 18 (see FIG. 6). This, too, engages by way of a peripheral edge 19 under the annular collar 10 of the article 2. As a result, the article is held at only two points and not in a form-fitting manner, but rather is in frictional contact with the movable directing element 18.

This has the effect that the article is set in rotation about its longitudinal axis. This gyroscope effect stabilizes the transport of the article.

The distance between the stationary directing element 17 and the movable directing element 18 is larger than the diameter of the article, but smaller than the diameter of the annular collar.

The movable directing element 18 may be arranged horizontally, vertically or in a manner inclined in all intermediate positions with respect thereto.

The essence of the present invention is what is known as an air diverter 20 in the region of the guide 16. The stationary directing element 17 ends upstream of this air diverter 20 while the movable directing element 18 continues.

Provided in the air diverter 20 is a housing 21 having a slot 22. In the housing 21, a negative pressure or a suction stream is generated which, as indicated in FIG. 6, has the effect that the article 2 is pulled with its annular collar toward the slot 22 and is held on the movable directing element 18. In this case, the lower part of the body of the article 2 can still be supported against a stop 23.

The way in which this air diverter according to the invention operates is as follows:

If the articles back up after the air diverter along the further guide, which consists of a continuation of the stationary directing element 17 and of the movable directing element 18, surplus articles and all articles which are not correctly oriented, not correctly positioned or are interlocked are eliminated. The back pressure in the air diverter has the effect that these articles are stripped off the movable directing element or are pushed away by following articles such that they pass out of the region of the suction stream and drop off. This is because the articles are transported only on one side in the region of the air diverter and can be kept in equilibrium only by the suction stream and one edge. The suction stream acts primarily on the top part of the article; if this is pushed away, the article is subjected only to gravity. This entire process is self-regulating; only the suction stream or the negative pressure can be regulated in a process-dependent and/or article-type-dependent manner. If the backup is resolved, transport of the articles takes place in a completely unhindered manner. In defined process states, a for example mechanically actuated air bypass 27 can be opened so that all articles are rejected at the air diverter.

All of the articles 2 which are transported after the air diverter 20 along the guide 16 are considered to be correctly oriented and correctly positioned. Accordingly, the position of the articles is ensured for further transport to the blow-molding machine by a third holding-down means 25.

According to the invention, the articles are transported along the guide 16 with a low thrust pressure. However, for reliable transfer of the articles to the blow-molding machine, a certain amount of thrust pressure is necessary. Therefore, shortly upstream of the transition to the stepping wheel of the blow-molding machine, the guide 16 has a thrust generation device which contains a stationary, spring-loaded pressure-exerting contour which comes into contact with the article, preferably above the protrusion 10, and presses the article against the movable directing element 18. As a result, the force that is transferable from the movable directing element 18 to the article by friction is correspondingly larger and this pressed article accordingly exerts the necessary thrust pressure on the articles backed up downstream in the direction of the blow-molding machine.

The invention claimed is:

1. A method for transporting articles to to a station, comprising providing each article with a protrusion and moving the article by a drive along a guide, wherein, along at least a part of the guide, the article is held against an abutment by an air stream and is transported further along this abutment, the protrusion on the article is accommodated in a slot in the abutment and the article is rotated about a longitudinal axis of the article during transport.

2. The method as claimed in claim 1, including urging the article against the abutment by pressurized air.

3. The method of claim 1, wherein the article is a preform.

4. The method of claim 1, wherein the station is a blow-molding apparatus.

5. An apparatus for transporting articles to a station, comprising each article has a protrusion and is movable by a drive along a guide, and a device for producing an air stream that acts on the article is provided along at least a part of the guide, wherein the air stream flows through a slot in the device, wherein the slot receives the protrusion on the article, wherein the air stream is a suction stream.

6. The apparatus of claim 5, wherein the article is a preform.

7. The apparatus of claim 5, wherein the station is a blow-molding apparatus.

* * * * *